United States Patent [19]
Graham et al.

[11] Patent Number: 5,587,692
[45] Date of Patent: Dec. 24, 1996

[54] COMMON MODE CURRENT CANCELLATION IN TWISTED PAIRS

[75] Inventors: Martin H. Graham, Berkeley; Matthew Taylor, Pleasant Hill, both of Calif.

[73] Assignee: Tut Systems, Inc., Pleasant Hill, Calif.

[21] Appl. No.: 345,111

[22] Filed: Nov. 28, 1994

[30] Foreign Application Priority Data

May 18, 1994 [WO] WIPO ............ PCT/US94/05618

[51] Int. Cl.$^6$ ............................................. H04B 3/30
[52] U.S. Cl. ........................ 333/12; 333/24 R; 333/25
[58] Field of Search .................... 361/58, 111, 119, 361/132, 133, 134, 135; 333/12, 25, 26, 32, 24 R, 1, 4, 5

[56] References Cited

U.S. PATENT DOCUMENTS

| | | | |
|---|---|---|---|
| 2,008,061 | 7/1935 | Coolidge et al. | 333/12 |
| 3,612,744 | 10/1971 | Thomas | 174/36 |
| 3,761,842 | 9/1973 | Gandrud | 333/1 |
| 3,869,585 | 3/1975 | Snyder | 179/173 |
| 3,949,169 | 4/1976 | Braeckelmann | 178/68 |
| 4,222,016 | 9/1980 | Stock et al. | 333/24 R |
| 4,717,896 | 1/1988 | Graham | 333/25 |
| 4,800,344 | 1/1989 | Graham | 333/25 |
| 4,999,594 | 3/1991 | Ingman | 333/181 |
| 5,003,579 | 3/1991 | Jones | 379/93 |
| 5,095,291 | 3/1992 | Staschover et al. | 333/12 |
| 5,113,159 | 5/1992 | Adriaenssens et al. | 333/12 |
| 5,121,090 | 6/1992 | Garuts et al. | 333/124 |
| 5,191,300 | 3/1993 | Graham et al. | 330/310 |
| 5,346,410 | 9/1994 | Moore, Jr. | 439/607 |
| 5,379,005 | 1/1995 | Aden et al. | 333/24 R |
| 5,414,393 | 5/1995 | Rose et al. | 333/1 |

FOREIGN PATENT DOCUMENTS 166838  7/1991  Japan.
2243038 10/1991 United Kingdom.

*Primary Examiner*—Benny Lee
*Assistant Examiner*—David H. Vu
*Attorney, Agent, or Firm*—Blakely, Sokoloff, Taylor & Zafman, LLP

[57] ABSTRACT

A method for connecting together two twisted pair lines in a LAN so as to avoid common mode current. The invention recognizes that the impedance to ground is different for each wire in the twisted pair line. Moreover, this impedance is different from spool-to-spool for lines having the same purported impedance. A balun is placed at the connection between the lines.

3 Claims, 3 Drawing Sheets

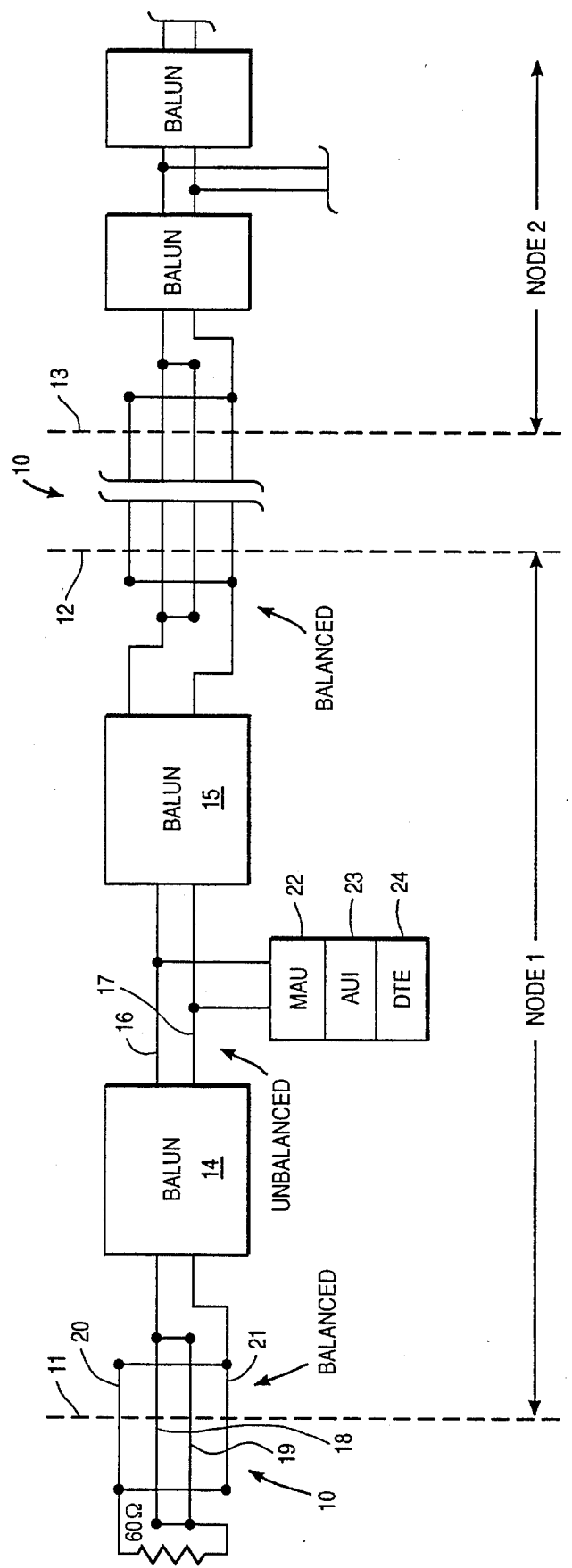

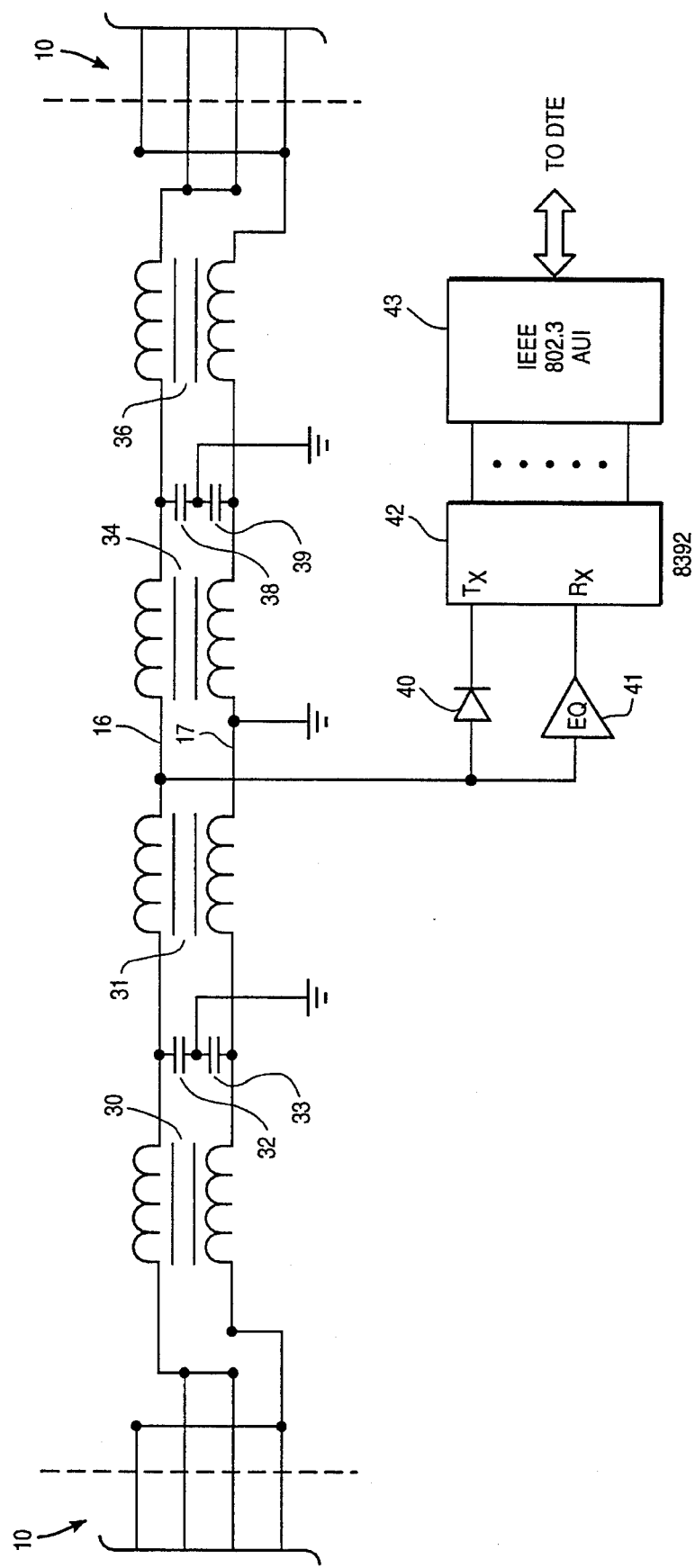
FIG_2

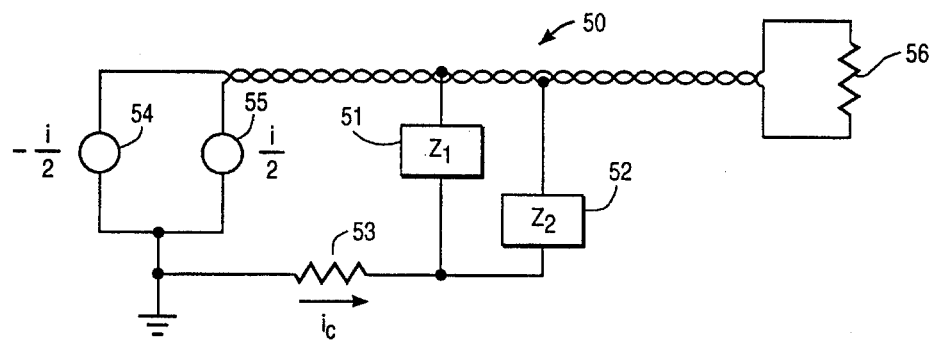
FIG_3
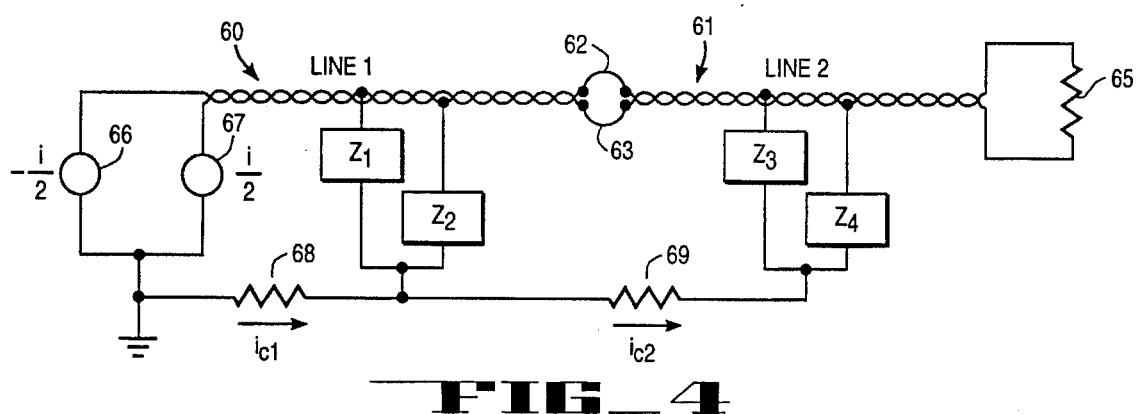
FIG_4
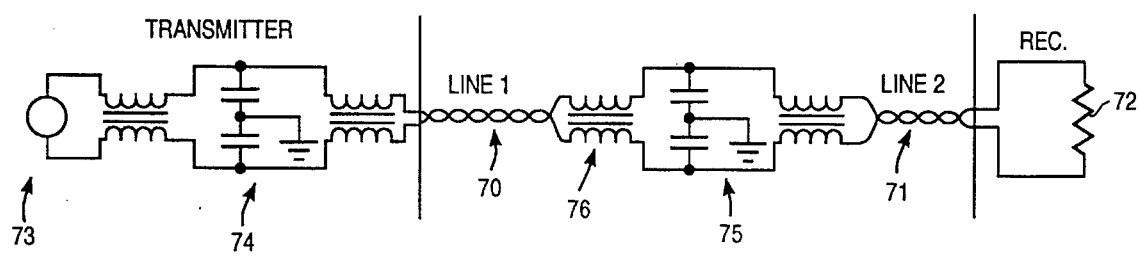
FIG_5
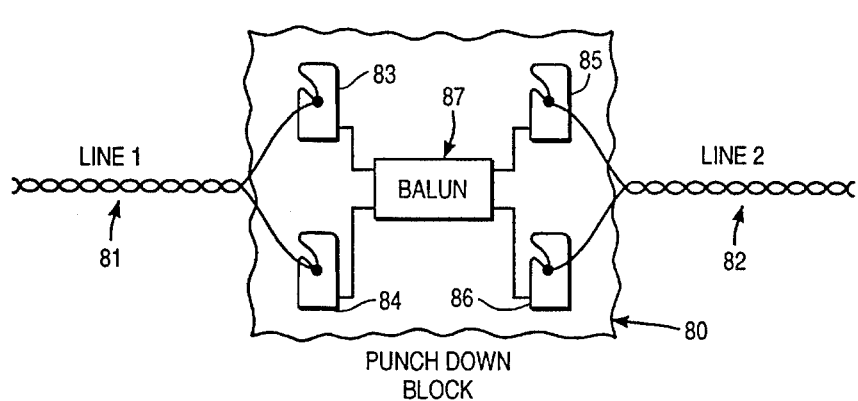
FIG_6

COMMON MODE CURRENT CANCELLATION IN TWISTED PAIRS

BACKGROUND OF THE INVENTION

1. Field of the Invention

The invention relates to local area networks (LANs) and more particularly, to connecting two twisted pair lines.

2. Prior Art

Local area networks (LANs) have become widely used, particularly to interconnect personal computers, servers, peripherals, etc. Among the most popular LANs is Ethernet which often uses a 50 ohm coaxial cable or uses an unshielded twisted pair line having 100 ohm characteristic impedance.

In these networks with unshielded cables, it is often desirable that the current in the medium be balanced, that is, that the network operate in a differential mode since this prevents troublesome radiation and limits susceptibility to external electronic noise. There are numerous well-known circuits, filters, terminators, etc. for preventing radiation from and limiting the susceptibility of these networks.

As will be seen, the present invention provides for common mode current cancellation where two twisted pair lines are connected together.

SUMMARY OF THE INVENTION

An improved method for connecting a first and a second twisted pair lines where each of the lines has a first and second wire. The connection is used to provide a continuous, uninterrupted connection between the first wires of the first and second lines and the second wires of the first and second lines. The first step comprises the providing of a means for canceling common mode currents having a first, second, third and fourth leads. This cancellation means provides a first DC path between the first and third leads and a second DC path between the second and fourth leads. The first wire of the first line is connected to the first lead and the second wire of the first line is connected to the second lead. The first wire of the second line is connected to the third lead and the second wire of the second line is connected to the fourth lead.

In the currently preferred embodiment, the means for canceling common mode current is a balun.

In still another embodiment, the balun is incorporated into a punch down block or patch panel.

BRIEF DESCRIPTION OF THE DRAWINGS

FIG. 1 shows a portion of a network.

FIG. 2 is an electrical schematic of one node of a network.

FIG. 3 is a diagram showing the impedances to ground associated with a twisted pair line.

FIG. 4 is a diagram illustrating the impedances to ground associated with two twisted pair lines.

FIG. 5 shows the connecting together of first and second twisted pair lines in accordance with the present invention.

FIG. 6 is a diagram showing a punch down block incorporating a balun in accordance with the present invention.

DETAILED DESCRIPTION Of THE PRESENT INVENTION

An improved method for connecting together first and second twisted pair lines is described.

Referring first to FIG. 1 a portion of a LAN is illustrated which has a medium (cable) 10 supporting a node 1 defined between the dotted lines 11 and 12 and supporting a second node, node 2, partially shown to the right of the dotted line 13.

In the currently preferred embodiment, the medium 10 is a flat parallel wire telephone cable sometimes referred to as "silver-satin" that has at least four conductors; specifically, two inner conductors 18 and 19 (typically color coded red and green) and two outer conductors 20 and 21 (typically color coded yellow and black). The cable 10 in some cases may include additional outer pairs since such cabling often contains six or eight conductors.

In the presently preferred embodiment, to connect a node into the cable 10, the cable is cut or otherwise opened, the outer conductors 20 and 21 are electrically connected together and the inner conductors 18 and 19 are also connected together. This forms two leads at each end of the cut. Two of these leads are connected to a balun 14 and the other two to a balun 15. The baluns 14 and 15 are connected in series as shown by the leads 16 and 17. Thus, the baluns 14 and 15 are connected in series with the cable 10 as illustrated.

Typically the cable 10 has a characteristic impedance of approximately 100 ohms for adjacent pairs of conductors. With the conductors of cable 10 connected as shown in FIG. 1, the characteristic impedance of the cable is reduced to approximately 60 ohms. This provides several advantages which will be discussed later.

The remainder of the medium access unit (MAU 22) is connected to the leads 16 and 17. MAU 22, as is customarily done in Ethernet LANs, is connected to an attachment unit interface (AUI 23). This interface is connected to a computer, repeater or the like, sometimes generically referred to as data terminal equipment (DTE 24).

In LANs using unshielded cables, it is desirable to maintain only balanced conditions (differential mode current) in the medium to prevent electromagnetic interference both to and from the LAN. This goal is made more difficult because transceivers often introduce common mode currents into the medium. With the present invention, the baluns 14 and 15 form a zone between them where the unbalanced currents can be better tolerated since their effect on the medium is attenuated by the baluns.

The ends of the medium are terminated in 60 ohm resistors, the characteristic impedance of the cable. The two outer conductors are connected to one terminal of a resistor and the two inner conductors are connected to the other terminal of the resistor as shown in FIG. 1.

Referring now to FIG. 2, a node in accordance with the present invention is shown in more detail. The opening of a cable 10, formed to allow for the node, is again shown connected in series with two baluns. One balun comprising the bifilar chokes 30 and 31 with capacitors 32 and 33 connected between the chokes. The other balun includes the bifilar chokes 34 and 36 with capacitors 38 and 39 connected between them.

The leads 16 and 17 are again shown in FIG. 2 with the lead 17 connected to ground. The lead 16 is connected through the diode 40 to the transmit terminal of a transceiver 42. The diode 40 is typically used on the transmission terminal of transceivers, such as transceiver 42, to provide isolation to the driver transistors within the transceiver. Lead 16 also provides the received signal which is coupled to the receive signal terminal of the transceiver 42 through an equalizer 41.

In the currently preferred embodiment the transceiver comprises an integrated circuit, part number 8392, manufactured by National Semiconductor as well as other companies. (Other commercially available transceivers may be used). The output of the transceiver 42 is connected to the DTE through an attachment unit interface (AUI 43). In the currently preferred embodiment the AUI complies with IEEE Standard 802.3, 10 Base5 AUI part.

The equalizer 41 is only required where the cable 10 is very long. There is an equalizer within transceiver 42 which is adequate for many LANs. The optional equalizer 41 can be built as described in U.S. Pat. No. 5,191,300. It should provide broadband performance, for example, from DC to 15 MHz.

In the currently preferred embodiment, the baluns have low transmission loss for differential signals; this is helpful since there are two baluns for each node. Also they should have a differential impedance (e.g., 60 ohms) that matches the transmission line impedance in order to prevent mismatches between the cables and the nodes.

Referring again to the cable 10 shown in FIGS. 1 and 2, connecting the inner conductors together and the outer conductors together provides several important advantages:

A key problem in some LANs is detecting the polarity of the data. For example, where an ordinary flat telephone wire transmission line (two conductors) is used, these conductors may be reversed (red to green and green to red) at various points in the network; this is caused by some modular telephone cables that reverse the conductors. These reversals add to the problem of deciding on polarity. If multiple cables are used and some or all have reversals, the polarity of the data will vary along the length of the LAN making it difficult for individual nodes to properly interpret its sense. These reversals also cause problems when simultaneous transmissions occur since the transmissions can cancel each other, making detection of simultaneous transmissions (collisions) more difficult.

With the inner and outer conductors connected as shown in FIGS. 1 and 2 the problem of polarity reversal is eliminated. Such reversals become transparent since the inner conductors are effectively one conductor and the outer conductors are the other conductor of the medium. Even if modular telephone connectors are used that reverse the red and green leads and the yellow and black leads, polarity is not reversed.

As mentioned, with the connections shown in FIG. 1 and 2, the characteristic impedance is reduced from approximately 100 ohms to 60 ohms. Typically, 50 ohm coaxial cable is used in Ethernet applications. The difference between 50 ohms and 60 ohms is small enough to permit some circuits, particularly integrated circuits, designed for Ethernet coaxial cable to be more effectively used with the flat telephone cable as connected above. Moreover, with a 60 ohm impedance versus a 100 ohm impedance, loading of the medium by the nodes becomes less of a problem since it is easier to achieve a high ratio of load-to-cable impedance.

The cable connection discussed above may also be used for two buses. A flat parallel wire telephone cable having two inner conductors and three outer pairs is used. The inner conductors are connected together and the pair of outer conductors adjacent to the inner conductors are also connected together to form one bus. The next outer pair of conductors are connected and the outer most pair of conductors are connected thereby forming a second bus.

Method for Connecting Together Two Twisted Pair Lines

First referring to FIG. 3, a twisted pair line 50 is shown terminated in a resistor 56. A differential mode signal is driven onto line 50 through the current drivers 54 and 55. The impedance between one wire of the twisted pair line 50 and ground is shown as impedance 51 ($Z_1$) and the impedance from the other wire in the twisted pair line 50 is shown as impedance 52 ($Z_2$). A ground return path is illustrated by resistor 53. The resistance of resistor 53 is small compared to $Z_1$ or $Z_2$ and for purposes of discussions, resistor 53 will be ignored.

Ideally, all the signals in line 50 should be differential mode current, not common mode current, since the common mode current radiates from the line 50 causing interference. The common mode current is shown through the ground path which includes resistor 53.

It has been determined that the impedance per unit length between one wire of a twisted pair line and ground is different than the impedance per unit length between the other wire of the same twisted pair line and ground. This impedance is predominately capacitive. Perhaps more importantly, it has been determined that the impedances $Z_1$ and $Z_2$ are different for twisted pair lines coming from different spools even where the twisted pair lines come from the same manufacturer and have the same purported nominal characteristics. That is, twisted pair lines coming from different spools which have the same gauge wire, same number of twists per inch and the same wire coating will, nonetheless have different impedances as will be discussed in more detail in conjunction with FIG. 4. However, a line from the same spool typically has a near constant impedance (per unit length) between each of the wires and ground. That is $Z_1$ is typically constant for a spool and $Z_2$ is typically constant for a spool even though $Z_1$ and $Z_2$ are not equal.

Referring again to FIG. 3, if the signal drive onto line 50 is from a current driver as shown in FIG. 3, even if $Z_1$ is unequal to $Z_2$, $I_c$ for a first order approximation, is equal to zero. On the other hand, if voltage drivers are used to drive the differential signal onto line 50, $I_c$ will not be zero. One way of effectively using a voltage driver is to place a balun between the signal source and twisted pair line connecting it to a balanced current driver.

Referring now to FIG. 4, assume that a first twisted pair line 60 is connected to a second twisted pair line 61 by connectors 62 and 63. One end of line 60 is receiving a differential mode signal from the current drivers 66 and 67 and the far end of line 61 is terminated in a terminating resistor 65. Assume further that line 60 and line 61 are from different spools of twisted pair line. The impedance from one wire of line 60 to ground is shown as $Z_1$ and the impedance from the other wire to ground is shown as $Z_2$. In line 61 the impedance from one wire of line 61 to ground is shown as $Z_3$ and the impedance from the other wire of line 61 to ground is shown as $Z_4$. For purposes of this discussion it is assumed that $Z_1 \neq Z_2 \neq Z_3 \neq Z_4$. As mentioned, this is typically the case even for lines having the same nominal characteristics when taken from different spools and certainly the case where lines, for example, have different gauge wires. The earth-return paths are shown as resistors 68 and 69 both of which have relatively little resistance compared to the magnitudes of $Z_1$ through $Z_4$ and for purposes of discussion, these resistors are ignored.

In practice, for the conditions described in FIG. 4 $iC_1$ and $iC_2$ will not be zero even if a differential current source is used. Thus, when two different twisted pair lines are used there is almost always some common mode current resulting from the difference between $Z_1$ through $Z_4$.

Assume for sake of discussion that $Z_1$ through $Z_4$ are pure resistance. For $iC_1$ and $iC_2$ to be zero the following would have to be true (for a first order approximation) $R_3/(R_1+R_3)=R_4/(R_2+R_4)$. This is unlikely to occur in practice.

Referring now to FIG. 5, two twisted pair lines 70 and 71 are shown which correspond to line 60 and 61 of FIG. 4. The far end of line 71 is terminated in resistor 72. Instead of being directly connected by ordinary connectors, lines 70 and 71 are connected through a balun such as balun 75. The balun is typically a four terminal, bidirectional device which receives the two wires from line 70 at one end and the two wires from line 71 at its other end. It provides a DC path between one wire of line 70 and one wire of line 71 and a DC path between the other wire of line 70 and the other wire of line 71. As shown in FIG. 5, line 70 is driven from a transmitter which has a signal generator 73. This signal generator is shown coupled through a balun 74, thus if the signal generator 73 is a voltage source, the balun 74 provides the current drive such as shown in FIG. 4 by current sources 66 and 67.

While in the currently preferred embodiment, a DC path through the windings of the balun are provided, only an AC path may be used in connection with the balun where appropriate. What is significant about the connection of FIG. 5 is that the connectors 62 and 63 of FIG. 4 have been replaced by the balun 75. What occurs is that, in effect, a second differential current source is present at the connection of lines 70 and 71 because of the cancellation that occurs of the common mode current by the balun 75. Thus, even though the impedances to ground associated with lines 70 and 71 are different, no common mode current will flow in either line (to a first order approximation).

While in the preferred embodiment a balun, such as balun 75 is used, good results can be obtained if the balun 75 is replaced by a bifilar choke such as the choke 76 used in the balun 75.

Referring to FIG. 6, the present invention may be implemented on a punch down block such as the punch down blocks commonly used for patching together twisted pair lines. A portion of a punch down block 80 is shown in FIG. 6 having four forked pins 83, 84, 85 and 86. Each of the pins are electrically isolated from one another but connected to the balun 87 which may be similar to the balun 75 of FIG. 5. One terminal of balun 87 is coupled to the pin 83, another to the pin 84 a third terminal to the pin 85 and a fourth terminal to the pin 86. DC paths exist through the balun 87 for the implementation shown between pins 83 and 85 and between pins 84 and 86. The balun 87 is preferably mounted directly to the block 80 and is a permanent part of the block. When it is necessary to connect two twisted pair lines together, such as lines 81 and 82, one wire of line 81 is punched down into pin 83 and the second wire of line 81 is punched down into pin 84. Similarly, one wire of 82 is punched down into pin 85 and the other wire of line 82 is punched down into pin 86.

While in the embodiment of FIG. 6 a punch down block is illustrated, the balun may also be mounted to a patch panel or similar panel to permit the two twisted pair lines to be connected together through a balun.

Where three lengths of twisted pair lines are connected two baluns are used at the two connections to form a continuous line, and so on.

An improved method has been described for connecting together two twisted pair lines. The connection substantially cancels common mode currents which may be caused by different impedances between the wires of the line and ground.

We claim:

1. A method of connecting together a first and a second twisted pair lines each of the lines having a first and second wire so as to form a continuous, uninterrupted electrical connection between the first wires of the first and second lines and the second wires of the first and second lines, comprising the steps of:

providing a balun for canceling common mode currents resulting from different impedances in the first and second wires of the first and second twisted pair lines, the balun having a first, second, third and fourth leads;

connecting the first wire of the first line to the first lead;

connecting the second wire of the first line to the second lead;

connecting the first wire of the second line to the third lead; and connecting the second wire of the second line to the fourth lead.

2. An improved punch down block for connecting together a first and a second twisted pair lines, each of the lines having a first and a second wire, comprising:

a board;

a first, second, third and fourth forked pins mounted on the board; and a balun for canceling common mode currents resulting from different impedances in the first and second wires of the first and second twisted pair lines, the balun mounted on the board having four leads, each connected to one of the four pins such that a first electrical path exists through the balun between the first and third pins and a second electrical path exists between the second and fourth pins.

3. The punch down block of claim 2 wherein the first and second electrical paths each include a DC path through windings in the balun.

\* \* \* \* \*